US010934922B2

(12) United States Patent
Khaled et al.

(10) Patent No.: US 10,934,922 B2
(45) Date of Patent: Mar. 2, 2021

(54) SYSTEMS AND METHODS FOR SCR FEEDGAS DIAGNOSTICS

(71) Applicant: Cummins Emission Solutions Inc., Columbus, IN (US)

(72) Inventors: Nassim Khaled, Columbus, IN (US); Michael Haas, Columbus, IN (US); Yinghuan Lei, Columbus, IN (US); Richard J. Ancimer, Toronto (CA)

(73) Assignee: Cummins Emission Solutions Inc., Columbus, IN (US)

(*) Notice: Subject to any disclaimer, the term of this patent is extended or adjusted under 35 U.S.C. 154(b) by 0 days.

(21) Appl. No.: 16/601,195

(22) Filed: Oct. 14, 2019

(65) Prior Publication Data

US 2020/0040797 A1 Feb. 6, 2020

Related U.S. Application Data

(62) Division of application No. 15/433,339, filed on Feb. 15, 2017, now Pat. No. 10,480,384.

(51) Int. Cl.
*F01N 11/00* (2006.01)
*F01N 3/10* (2006.01)
(Continued)

(52) U.S. Cl.
CPC ............ *F01N 11/005* (2013.01); *F01N 3/106* (2013.01); *F01N 3/0821* (2013.01); *F01N 3/103* (2013.01);
(Continued)

(58) Field of Classification Search
CPC ........ F01N 3/103; F01N 3/106; F01N 11/002; F01N 11/005; F01N 2900/1404;
(Continued)

(56) References Cited

U.S. PATENT DOCUMENTS 9,273,587 B2 3/2016 Khaled et al.
9,422,847 B2 8/2016 Osburn et al.
(Continued)

FOREIGN PATENT DOCUMENTS

CN 107630734 A 1/2018
EP 3 048 276 A1 7/2016

OTHER PUBLICATIONS

Search Report from corresponding UK Patent Application No. GB1801404.3, dated Jul. 19, 2018, pp. 1-5.
(Continued)

*Primary Examiner* — Jonathan R Matthias
(74) *Attorney, Agent, or Firm* — Foley & Lardner LLP

(57) ABSTRACT

A method for diagnosing feedgas generation capacity of an oxidation catalyst in an exhaust aftertreatment system includes: determining a first temperature value at a first location in the exhaust aftertreatment system upstream of an oxidation catalyst, the oxidation catalyst being upstream of a selective catalytic reduction catalyst; determining a space velocity of the exhaust in the oxidation catalyst; determining an estimated exotherm value of the oxidation catalyst based on the first temperature value and the space velocity; instructing a doser of the aftertreatment system to dose hydrocarbon into the oxidation catalyst; determining an in-use exotherm value of the oxidation catalyst upon insertion of the hydrocarbon into the oxidation catalyst; and determining a fault condition based upon a comparison between the estimated exotherm value and the in-use exotherm value.

16 Claims, 12 Drawing Sheets

(51) Int. Cl.
*F01N 3/20* (2006.01)
*F01N 3/08* (2006.01)
*F01N 9/00* (2006.01)

(52) U.S. Cl.
CPC .............. *F01N 3/206* (2013.01); *F01N 3/208* (2013.01); *F01N 3/2066* (2013.01); *F01N 9/00* (2013.01); *F01N 2560/06* (2013.01); *F01N 2610/03* (2013.01); *F01N 2900/1404* (2013.01); *F01N 2900/1411* (2013.01); *F01N 2900/1602* (2013.01)

(58) Field of Classification Search
CPC ............. F01N 2560/06; F01N 2560/07; F01N 2900/1411; F01N 2900/1602; F01N 2900/1621
See application file for complete search history.

(56) References Cited

U.S. PATENT DOCUMENTS

| | | | |
|---|---|---|---|
| 2004/0230366 | A1 | 11/2004 | Ueda et al. |
| 2009/0235645 | A1 | 9/2009 | Noda |
| 2012/0186226 | A1 | 7/2012 | Ren et al. |
| 2013/0269427 | A1 | 10/2013 | Nagaoka et al. |
| 2014/0331644 | A1 | 11/2014 | Kumar et al. |
| 2015/0135680 | A1 | 5/2015 | Ancimer et al. |
| 2018/0016962 | A1 | 1/2018 | Ardanese et al. |

OTHER PUBLICATIONS

Office Action dated Dec. 16, 2019 in Chinese Patent Application No. 2018100980192, and English Language Translation, 13 pages.

SYSTEMS AND METHODS FOR SCR FEEDGAS DIAGNOSTICS

CROSS-REFERENCE TO RELATED APPLICATIONS

This application is a divisional which claims the benefit of and priority to U.S. patent application Ser. No. 15/433,339, filed Feb. 15, 2017, the content of which is incorporated by reference herein in its entirety.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea may be typically introduced into the exhaust gas flow prior to the catalyst chamber. To introduce the reductant into the exhaust gas flow for the SCR process, an SCR system may dose or otherwise introduce the reductant through a dosing module (doser) that vaporizes or sprays the reductant into an exhaust pipe of the exhaust system upstream of the catalyst chamber. The SCR system may include one or more sensors to monitor conditions within the exhaust system. Further, the SCR system may include an oxidation catalyst, for example a diesel oxidation catalyst (DOC), to oxidize hydrocarbons and carbon monoxide in the exhaust gas and/or a particulate filter, for example a diesel particulate filter (DPF), to remove diesel particulate matter or soot from the exhaust gas of a diesel engine.

Catalysts such as the DOC and DPF that contain platinum-group metals (PGM), which help oxidize soot, hydrocarbon, and nitric oxide (NO), can also alter the ratio of nitric oxide and nitrogen dioxide ($NO_2$) that enters a downstream SCR catalyst. It is useful to diagnose the capability of PGM-containing catalysts to alter the SCR feedgas NO and $NO_2$ content: for an SCR to perform well, on its upstream, the DOC needs to oxidize a portion of NO to $NO_2$; thus, a DOC that is not capable of oxidizing enough NO may not be able to provide quality feedgas containing $NO_2$ to the SCR to reduce $NO_x$ emissions.

SUMMARY

Implementations described herein relate to systems and methods for SCR feedgas diagnostics. One embodiment relates to a method for diagnosing the feedgas generation capacity of an oxidation catalyst in an exhaust aftertreatment system. The method includes determining a first temperature value at a first location in the exhaust aftertreatment system upstream of an oxidation catalyst, where the oxidation catalyst is upstream of a selective catalytic reduction catalyst. A second temperature value is determined at a second location in the exhaust aftertreatment system downstream of the oxidation catalyst. A hydrocarbon dosing parameter, which is indicative of conditions for running a feedgas generation capacity diagnostic, is defined. Based at least on the hydrocarbon dosing parameter, hydrocarbon is intrusively dosed to the oxidation catalyst. Based at least on the first temperature value and the second temperature value, an in-use temperature signature is determined across the oxidation catalyst. A feedgas generation fault condition is determined, and a fault status indication, which includes the feedgas generation fault condition, is provided.

In some implementations, a modeled exotherm generation value is calculated across the oxidation catalyst by estimating heat transfer through the oxidation catalyst. In some implementations, the in-use temperature signature comprises the actual exotherm generated across the oxidation catalyst, and the feedgas generation fault condition is based on comparing the modeled exotherm generation value to an exotherm indicated by the in-use temperature signature. In certain implementations, the in-use temperature signature comprises the actual exotherm generated across the oxidation catalyst. The method may further comprise calculating potential energy of intrusively dosed hydrocarbon, calculating a normalized efficiency value based at least on the actual exotherm generated across the oxidation catalyst and the potential energy of the intrusively dosed hydrocarbon, and evaluating the normalized efficiency value to determine the feedgas generation fault condition.

In some implementations, the second temperature value is a maximum temperature value at an outlet of the oxidation catalyst from the in-use temperature signature generated during a diagnostic cycle, and the feedgas generation fault condition is determined based at least on comparing the in-use temperature signature with the estimated temperature signature. In some implementations, after intrusively dosing the hydrocarbon, an oxidation cycle is completed. A difference between the second temperature value and the first temperature value is evaluated to generate a temperature delta. The temperature delta is evaluated to determine the feedgas generation fault condition. In some implementations, an ambient temperature within the oxidation catalyst is evaluated during the diagnostic cycle and the temperature delta is adjusted based on ambient temperature. In some implementations, determining a hydrocarbon dosing parameter indicative of conditions for running a feedgas generation capacity diagnostic includes evaluating exhaust temperature at an outlet of the oxidation catalyst, space velocity of exhaust flow, and/or the temperature of a bed of the oxidation catalyst. In some implementations, the exhaust temperature at an inlet of the oxidation catalyst, indicative of conditions for running a feedgas generation capacity diagnostic, is within the range of 210 to 280 degrees Celsius. In some implementations, space velocity of exhaust flow, indicative of conditions for running a feedgas generation capacity diagnostic, is within the range of 4 to 40 1/sec. In some implementations, space velocity and DOC bed temperature are evaluated to determine the amount of hydrocarbon to dose.

Another embodiment relates to an exhaust aftertreatment system. The exhaust aftertreatment system includes an oxidation catalyst, which is positioned upstream of a selective catalytic reduction catalyst, a doser, which is fluidly coupled to the oxidation catalyst and communicatively coupled to a diagnostic hydrocarbon dosing switch, and a first sensor for measuring a first temperature of the exhaust at a first location upstream of the oxidation catalyst. The diagnostic hydrocarbon dosing switch is operable, in response to an in-use diagnostic hydrocarbon dosing command based at least on a measurement by the first sensor, to initiate insertion of diagnostic hydrocarbon in the oxidation catalyst based at least on the first temperature. In some implementations, the system includes a second sensor for measuring a second temperature of the exhaust at a second location downstream of the oxidation catalyst. The in-use diagnostic hydrocarbon dosing command is based at least on the second temperature measured by the second sensor. In some implementations, the doser is an external fuel doser. The external fuel doser includes a source of diagnostic hydrocarbon and is configured to introduce diagnostic hydrocarbon into the exhaust stream of the aftertreatment system. In other implementations, the doser is an in-cylinder doser. The in-cylinder doser includes a source of diagnostic hydrocarbon and is configured to introduce diagnostic hydrocarbon into the exhaust stream of the aftertreatment system.

In some embodiments, the oxidation catalyst is a first oxidation catalyst and the in-use diagnostic hydrocarbon dosing command is a first in-use diagnostic hydrocarbon dosing command. The system may include a second oxidation catalyst positioned upstream of the selective catalytic reduction system, the second oxidation catalyst having over 10% remaining operating capacity, a third sensor for measuring a third temperature of the exhaust upstream of the second oxidation catalyst, and a fourth sensor for measuring a fourth temperature of the exhaust downstream of the second oxidation catalyst. The diagnostic hydrocarbon dosing switch is operable, in response to a second in-use diagnostic hydrocarbon dosing command, to initiate insertion of diagnostic hydrocarbon in the second oxidation catalyst based at least on the third temperature and the fourth temperature. In some implementations, after both the first in-use diagnostic hydrocarbon dosing command and the second in-use diagnostic hydrocarbon dosing command are executed, a first temperature delta is calculated based on the first temperature and the second temperature, a second temperature delta is calculated based on the third temperature and the fourth temperature, and the first temperature delta is compared to the second temperature delta to determine a feedgas generation fault condition for the first oxidation catalyst.

In some implementations, a bed temperature sensor is configured to measure the temperature of a bed of the oxidation catalyst. The bed temperature sensor is positioned within the oxidation catalyst. The switch is on when the bed temperature, measured by the bed temperature sensor, is within the range of 210 to 280 degrees Celsius. In some implementations, an electronic circuit is operable to execute instructions for diagnosing the feedgas generation capacity of the oxidation catalyst: hydrocarbon is intrusively dosed from the doser into the oxidation catalyst, and an in-use exotherm of the oxidation catalyst is assessed to determine the fault condition of the oxidation catalyst. A space velocity sensor is configured to determine a space velocity value of a reagent introduced into the oxidation catalyst. The electronic circuit is operable to build a two-dimensional set comprising at least one space velocity value and at least one bed temperature value and, based on the at least one space velocity value and the at least one bed temperature value, initiate an intrusive hydrocarbon dosing process.

In some implementations, the system includes a second sensor for measuring a second temperature of the exhaust at a second location downstream of the oxidation catalyst. Determining the fault condition of the oxidation catalyst includes building a first set comprising at least one inlet temperature value measured by the first sensor and determining the maximum value in the first set, building a second set comprising at least one outlet temperature value measured by the second sensor and determining the maximum value in the second set, and, based at least on the difference between the maximum value in the first set and the maximum value in the second set, determining the fault condition of the oxidation catalyst. In some implementations, the oxidation catalyst is positioned within an oxidation catalyst enclosure, and determining the fault condition of the oxidation catalyst includes evaluating a surface area of the oxidation catalyst enclosure and adjusting for heat loss due to air moving across the surface area of the oxidation catalyst enclosure. In some implementations, determining the fault condition of the oxidation catalyst includes calculating the emissivity of the oxidation catalyst to adjust for heat loss due to thermal radiation.

In some implementations, catalyst clean-up is performed after the catalyst diagnosis in order to remove any unburned hydrocarbons or other contaminates that may have accumulated during the feedgas generation capacity diagnostic. Additionally, catalyst clean-up helps avoid face plugging (deposits that form as the result of unburnt fuel collecting on the front end of the DOC) and hydrocarbon adsorption on catalyst components. These measures allow one to reduce engine downtime and maintenance costs. Catalyst clean-up comprises modifying an operating parameter of the engine, such as increasing exhaust gas temperature and/or decreasing engine-out soot and hydrocarbon. In some implementations, determining the fault condition of the oxidation catalyst includes determining, by the diagnostic circuit, whether clean-up is needed by evaluating the level of contaminant accumulation in the DOC.

BRIEF DESCRIPTION

The details of one or more implementations are set forth in the accompanying drawings and the description below. Other features, aspects, and advantages of the disclosure will become apparent from the description, the drawings, and the claims, in which:

Figure 1:
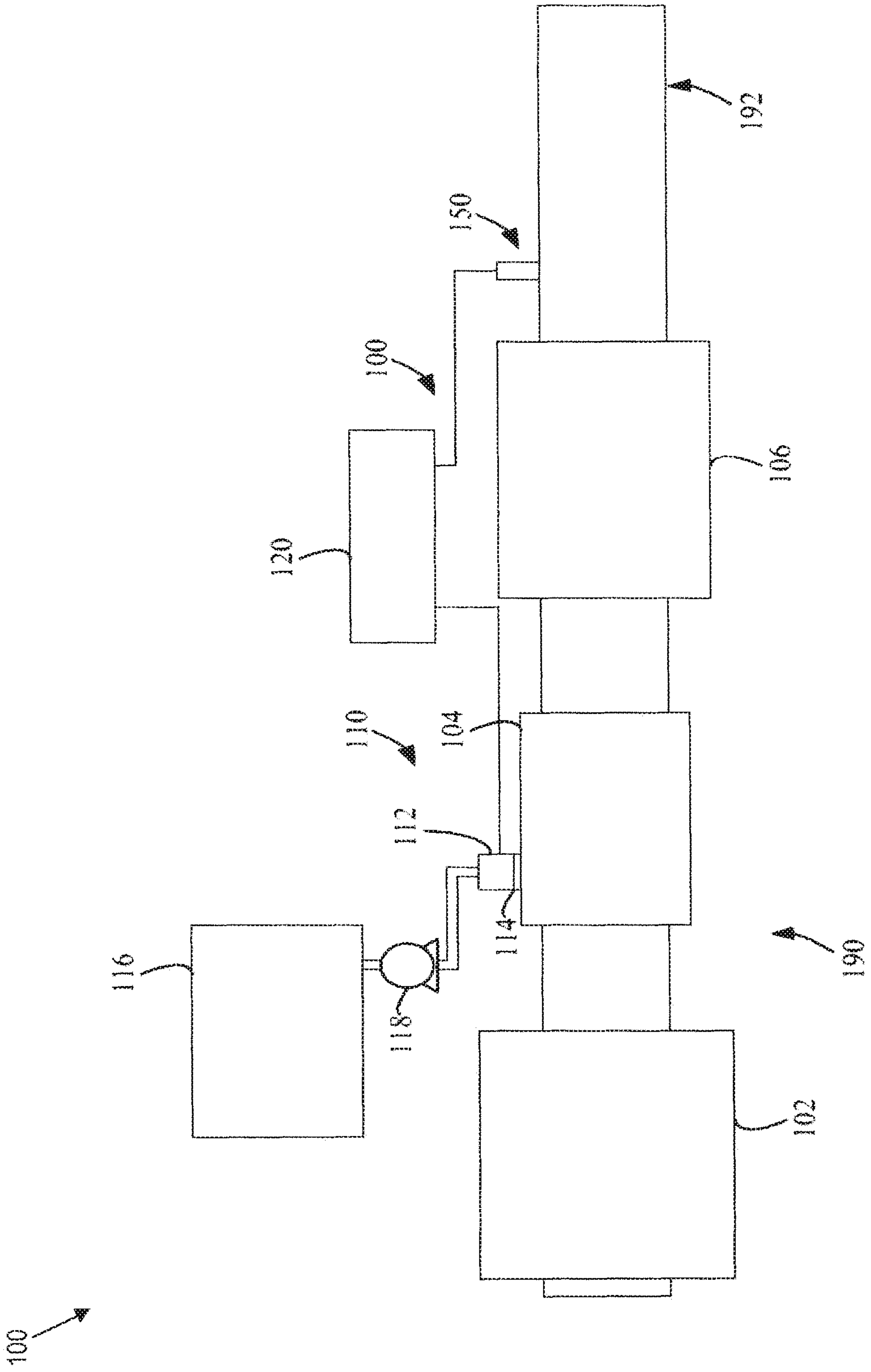
FIG. 1 is a block schematic diagram of an example SCR system comprising an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, assemblies, and systems for SCR feedgas diagnostics. The various concepts introduced above and discussed in greater detail below may be implemented in any of numerous ways, as the described concepts are not limited to any particular manner of implementation. Examples of specific implementations and applications are provided primarily for illustrative purposes.

1. Overview

In order to reduce emissions, systems and methods may be desired to improve the durability and performance of aftertreatment systems. For example, in 2010, the State of California implemented a set of regulatory rules addressing the requirements for on-board diagnostic (OBD) systems in heavy-duty engines. Under Title 13 of the California Code of Regulations (13 CCR § 1971.1), OBD systems, through the use of an onboard computer(s), may be required to monitor emission systems in-use for the actual life of the engine. OBD systems in these implementations may need to be capable of detecting malfunctions of the monitored emission systems, illuminating a malfunction indicator light (MIL) to notify the vehicle operator of detected malfunctions, and storing fault codes identifying the detected malfunctions.

In view of these and similar regulatory considerations, methods, apparatus, assemblies and/or systems may be provided to improve the performance of aftertreatment systems by implementing OBD to monitor the ability of catalysts to generate proper feedgas flow to SCRs and to detect catalyst failures. For example, one may assess and optimize the level of NO (nitric oxide) oxidation in order to ensure that the SCR functions property. On a related note, systems and methods may be provided to improve hydrocarbon dosing techniques in an SCR-containing DOC aftertreatment system.

Further, under the California rules, for example, for catalysts used to generate a feedgas constituency to assist SCR systems (e.g., to increase $NO_2$ concentration upstream of an SCR system), OBD systems may need to be able to detect malfunctions, such as when the catalyst is unable to generate the necessary feedgas constituents, for proper SCR system operation. Thus, as part of the process for detecting a failed DOC catalyst, criteria for detecting malfunctions may be established.

For the purpose of determining the catalyst malfunction criteria as part of the process for detecting a failed DOC in individually monitored catalysts, a catalyst deteriorated to the malfunction criteria using methods representing real world catalyst deterioration under operating conditions observed in normal and malfunctioning engines may be used. Where the catalyst system contains catalysts in parallel (e.g., a two bank exhaust system where each bank has its own catalyst), the malfunction criteria may need to be defined such that the "parallel" catalysts are equally deteriorated.

For the purpose of determining the catalyst malfunction criteria, a plan for catalyst system aging and monitoring may be implemented. Such a plan may include, for example, the description, emission control purpose, and location of each component, the monitoring strategy for each component and/or combination of components, and the method for determining the malfunction criteria including the deterioration/aging process.

Further with respect to malfunction criteria, systems and methods may be desired to optimize the following: the representativeness of the aging to real world catalyst system component deterioration under normal and malfunctioning engine operating conditions; the effectiveness of the method used to determine the malfunction criteria; the ability of the component monitor(s) to pinpoint the likely area of malfunction and ensure the correct components are repaired/replaced in-use; and the ability of the component monitor(s) to accurately verify that each catalyst component is functioning as designed.

Under the California rules, certain aftertreatment systems are exempt from OBD monitoring if both of the following criteria are satisfied: (1) no malfunction of the catalyst's feedgas generation ability can cause emissions to increase by 25 percent or more for SULEV30 and SULEV20 vehicles, 20 percent or more for ULEV70 and ULEV50 vehicles, and 15 percent or more for all other vehicles, where the percentage is based on the applicable standard as measured from an applicable emission test cycle; and (2) no malfunction of the catalyst's feedgas generation ability can cause emissions to exceed the applicable standard as measured from an applicable emission test cycle. Thus, systems may be exempt from OBD monitoring if both of the following conditions are met: (1) the worst case emissions level is lower than the FEL, and (2) the worst case emissions level is lower than the baseline emissions level+0.15*FEL such that if the increase from a back-to-back test sequence between normal and malfunctioning condition is less than 15 percent of the baseline test, results indicate a normal condition. Here, Family Emission Limit (FEL) refers to the exhaust emission levels to which an engine family is certified. As such, systems and methods may be needed to electronically specify and evaluate the parameters for OBD monitoring.

Conventional techniques for SCR feedgas diagnostics include non-intrusive solutions for DOC monitoring, which are not sufficiently robust. Diagnostic solutions utilizing intrusive techniques reduce uncertainty and noise factors to improve the robustness of the final diagnostic determination.

To tune hydrocarbon dosing techniques as part of this process, built-in systems and methods may be provided to determine an appropriate space velocity and temperature intersection across the DOC. Space velocity refers to the quotient of the entering volumetric flow rate of the reagents divided by the catalyst bed volume, indicating how many volumes of feedgas reagent can be treated in a unit time.

An example implementation, as set forth further herein, is designed to monitor the exotherm of the PGM-containing catalyst using a heat transfer model while hydrocarbons are introduced upstream of the catalyst.

2. Overview of Aftertreatment System

FIG. 1 depicts an aftertreatment system 100 having an example reductant delivery system 110 for an exhaust system 190. The aftertreatment system 100 includes a particulate filter (such as a DPF 102), the reductant delivery system 110, a decomposition chamber 104 or reactor pipe, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet 192, where the exhaust gas exits after having particulate matter substantially filtered from the exhaust gas and/or converting the particulate matter into carbon dioxide.

The decomposition chamber 104 is configured to convert a reductant, such as urea or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes an inlet in fluid communication with the decomposition chamber 104 from which exhaust gas and reductant is received and an outlet in fluid communication with an end of the exhaust system 190.

The exhaust system 190 may further include an oxidation catalyst, for example a DOC, in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber 104 or reactor pipe. For instance, the DPF 102 and the SCR catalyst 106 may be combined into a single unit, often referred to as a SDPF. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at another position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or six sensors 150 with each sensor 150 located at one of the foregoing positions of the exhaust system 190.

Figure 2:
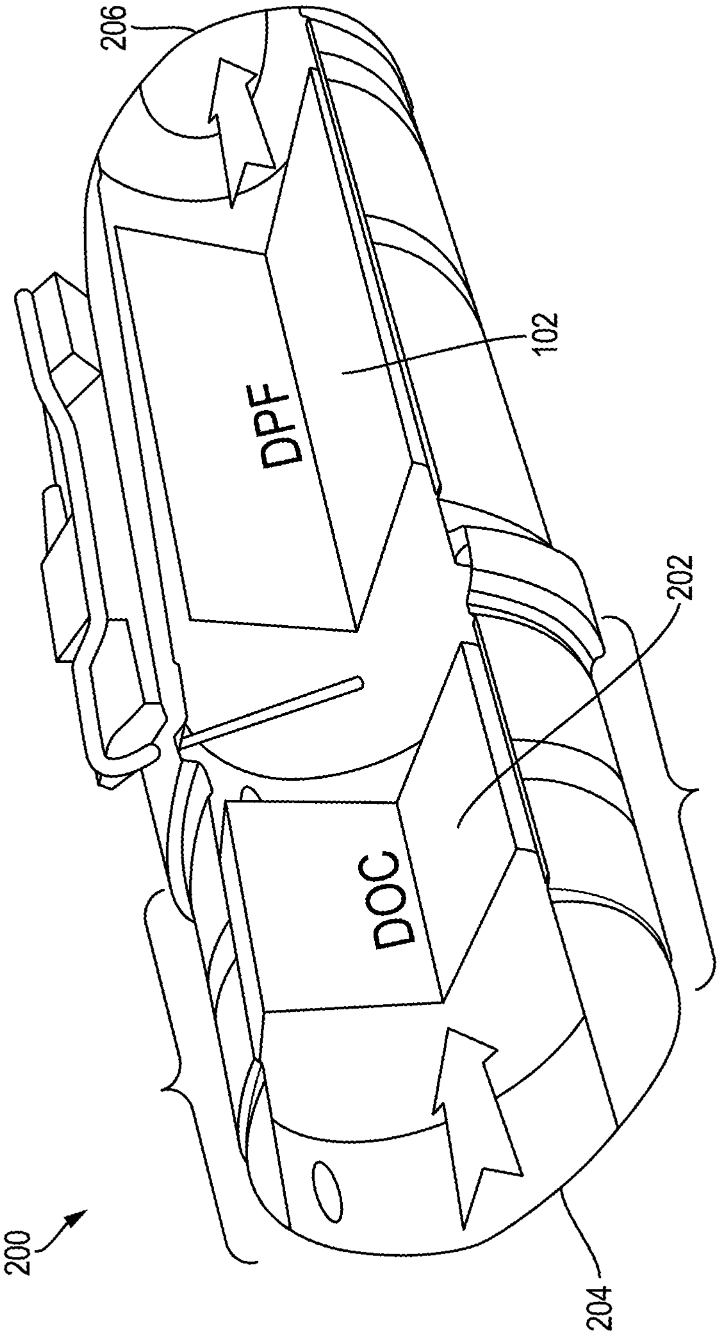
FIG. 2 shows an example exhaust aftertreatment system where the DOC and DPF components are both included and shown separately.

FIG. 2 shows an example exhaust aftertreatment system 200 where the DOC and DPF components are both included and shown separately. As shown, the example implementation includes a DOC 202 and a DPF 102. In some implementations, DOC 202 may take the place of the SCR catalyst 106 (or be in addition to the SCR catalyst 106) shown in FIG. 1.

As shown, the DOC 202 is positioned upstream of the DPF 102 in an end-in, end-out configuration such that exhaust gas flows in through an intake opening 204 positioned on a proximal end of the system 200. As shown, treated exhaust gas (feedgas) flows out through an outlet 206 positioned on a distal end of the system 200. Other configurations may be implemented in different embodiments, including, for example, vertical end-in end-out, horizontal end-in end-out, vertical end-in side-out, horizontal end-in side-out, or horizontal side-in side-out.

In the example configuration shown, exhaust gas is treated in a sequential manner—first by the DOC 202 to, for example, oxidize hydrocarbons and carbon monoxide and then by the DPF 102 to remove soot and particulate matter. In other configurations, exhaust gas may be treated simultaneously such that the DOC 202 and the DPF 102 are combined. In yet other configurations, feedgas may be treated in parallel by multiple, different DOC 202. Treated feedgas is released from the system via outlet 206 as discussed above. In an example embodiment, feedgas contains NO and $NO_2$.

One may intrusively add hydrocarbon to the exhaust stream in an aftertreatment system to determine whether the added amount of hydrocarbon generates heat. One may rely on this finding to determine whether the parts of an SCR can generate nitric oxide ($NO_2$.)

The examples presented herein are not intended to be exhaustive. For instance, the DOC 202 may be configured to treat feedgas in a variety of ways. An example of components suitable for oxidation by the DOC 202 includes presently unregulated hydrocarbon-derived emissions, such as aldehydes. Additionally, the DOC 202 may be used for reduction or elimination of the odor of diesel exhaust.

Figure 3:
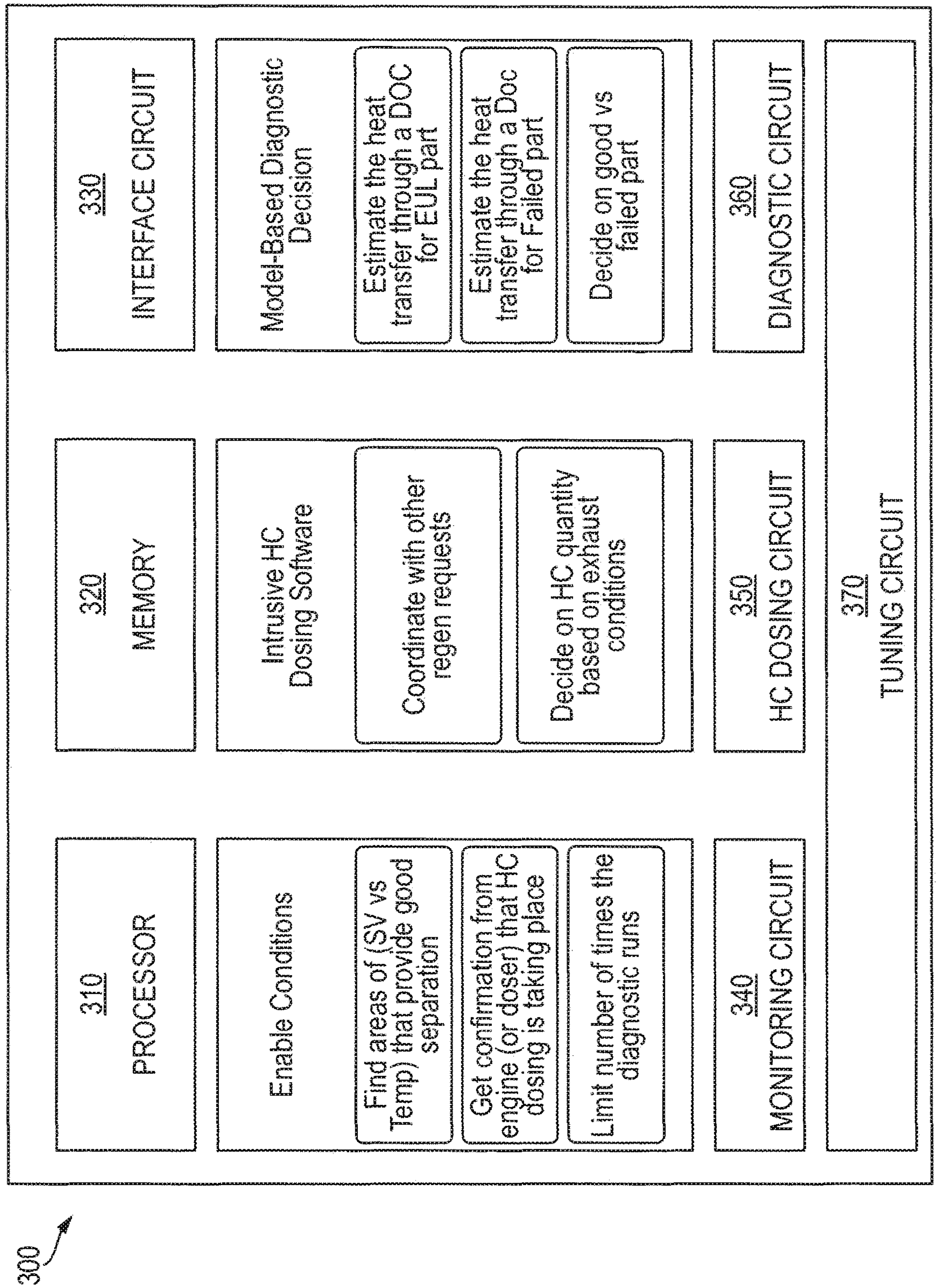
FIG. 3 is a block diagram of an example embodiment of an electronic control model (ECM) component for feedgas diagnostics in an SCR.

FIG. 3 is a block diagram of an example embodiment of an electronic control model (ECM) component for feedgas diagnostics in an SCR. The ECM component may be implemented as an electronic controller or circuit. As shown, the controller 300 comprises at least one processor 310, a memory 320, an interface circuit 330, and a monitoring circuit 340, a hydrocarbon dosing circuit 350, a diagnostic circuit 360, and a tuning circuit 370. Some or all of the circuits 340 through 370 may be operatively coupled with one another.

Some or all of these circuits may receive electronic signals and/or data inputs from other components of the aftertreatment system 100 via the interface circuit 330. Examples of these inputs may include numerical and/or binary values needed to estimate heat transfer parameters within the system, such as exhaust flow (measured in kg/s), DOC bed temperature (measured in K), upstream temperature (measured in K), ambient air temperature (measured in K), ambient air speed (measured in m/s), key switch status further described in reference to switch 568 of FIG. 5B (a binary value representing an "on" or "off" state), and hydrocarbon flow introduced into the exhaust stream (measured in g/s). Additionally, as described further herein, inputs may include the values needed to calculate oxidation conversion efficiency.

Based on all or some of the foregoing inputs, it is possible to detect whether the DOC and/or DPF can generate proper amounts of $NO_2$. Since the same catalyst material (e.g., PGM) that generates heat from hydrocarbons also turns NO into $NO_2$, one may intrusively add hydrocarbons to the exhaust stream and to determine if they generate heat on the DOC and/or the DPF. Based on that information, one may conclude whether the parts can generate $NO_2$ and determine the status of the part (good, EUL, or failed).

The controller 300 is further configured as described in reference to FIG. 4A through 7.

Figure 4A:
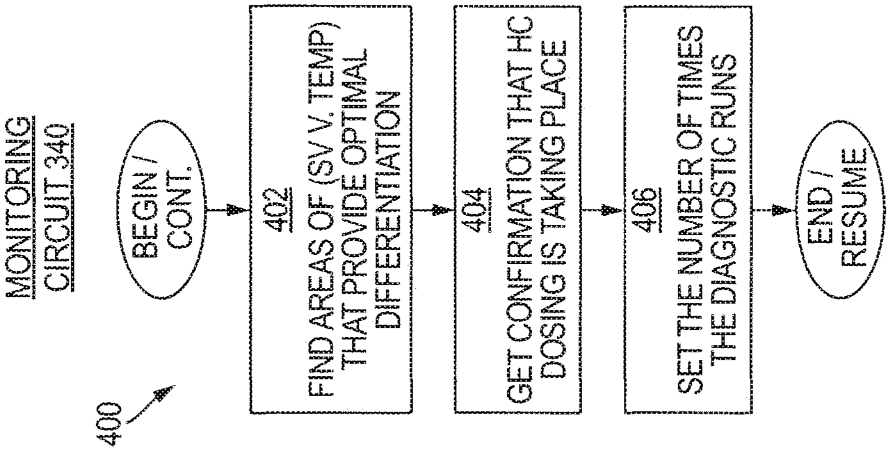
FIG. 4A is a flowchart showing an example process performed by a monitoring circuit of an ECM component for feedgas diagnostics in an SCR.

FIG. 4A is a flowchart showing an example process 400 performed by the monitoring circuit 340 of the controller 300. The process 400 enables the definition and management of conditions for hydrocarbon dosing based at least on feedgas diagnostics.

In the example embodiment shown in FIG. 4A and as described below, the amount of feedback hydrocarbons may be based on a calculation of a target temperature increase for the DOC in the aftertreatment process. Thus, hydrocarbons may be dosed to achieve a target temperature range (e.g., 100-150 degrees Celsius) and create a target temperature signature. Feedback hydrocarbon is defined as intrusively dosed hydrocarbon. As used herein, "temperature signature" refers to as the temperature within the DOC over a period of time.

As shown, the controller 300 defines and identifies (at 402) one or more two-dimensional regions in an intersection of two sets, the first set containing values pertaining to space velocity and the second set containing values reflecting the temperature of DOC 202. The sets may be populated by information detected by one or more sensors 150. The two-dimensional regions, when corresponding to observed in-use space velocity and temperature, may be used by the monitoring circuit 340 to generate a request to enable hydrocarbon dosing conditions, which may be processed as discussed with reference to FIG. 5B.

At 404, the controller 300 obtains information that hydrocarbon dosing is taking place. In some embodiments, this information may be obtained in the form of a status indicator such as one issued by the switch 568 shown in FIG. 5B. In other embodiments, this information may be obtained via the sensor 150. In some embodiments, the information may be obtained, for example, via the interface circuit 330.

At 406, the controller 300 sets the number of times the diagnostic runs. In some embodiments, this value may be used at 560 to set the value of a command limiter 562 of FIG. 5B so that, as an example, a regeneration request for a failed or EUL DOC 202 may be coordinated with other system management tasks, as described in reference to FIGS. 5A and 5B.

Figure 4B:
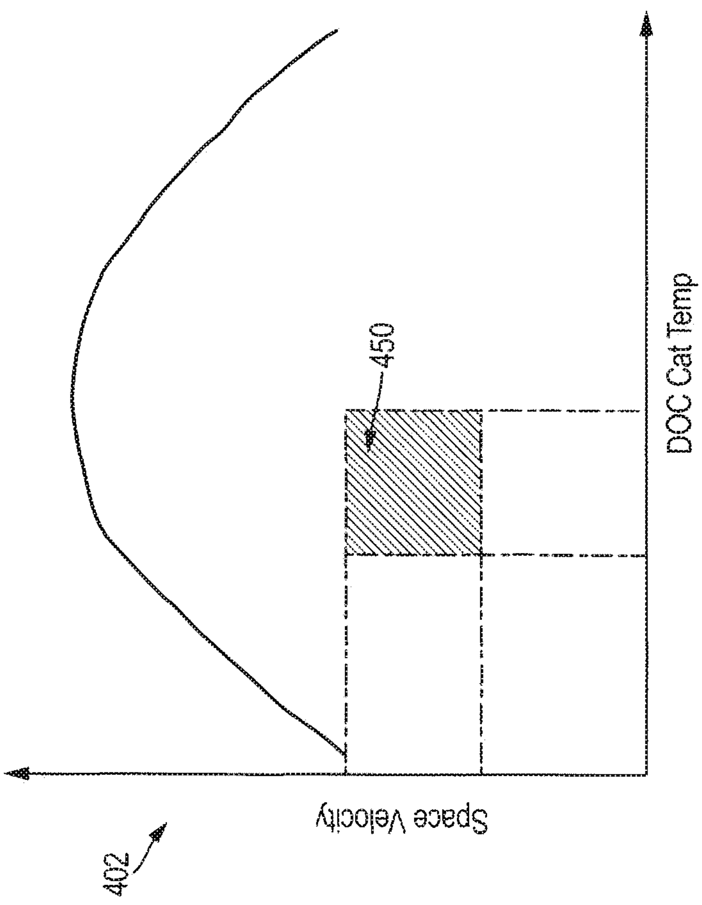
FIG. 4B is a graph illustrating a subprocess, performed by the monitoring circuit of an ECM component for feedgas diagnostics in an SCR, for determining a combination of input parameters expected to provide optimal performance.

FIG. 4B is a graph illustrating subprocess 402 performed by the monitoring circuit 340 of a controller 300 for determining a combination of input parameters expected to provide optimal performance. As shown, at 402 the monitoring circuit 340 identifies a region 450 where the combination of space velocity and temperature of the DOC 202 may be conducive to differentiating between healthy and failed parts with respect to hydrocarbon conversion ratio and/or the NO oxidation ratio.

Figure 5A:
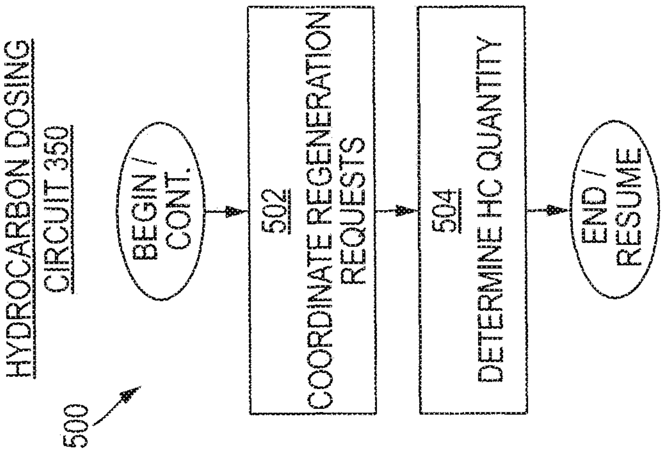
FIG. 5A is a flowchart showing an example process performed by a dosing circuit of an ECM component for feedgas diagnostics in an SCR.

FIG. 5A is a flowchart showing an example process 500 performed by the hydrocarbon dosing circuit 350 of the controller 300. The process 500 enables intrusive dosing of a reductant, such as hydrocarbons, in an exhaust aftertreatment system. In this context, intrusive dosing is defined as coordinated and adjustable near real-time, in-use control of hydrocarbon throughput. Advantageously, intrusive hydrocarbon dosing allows for the elimination of certain noise factors that confound traditional non-intrusive feedgas diagnostics. This results in diagnostic decisions that are more robust and less prone to faulty conclusions.

At 502, regeneration requests are coordinated by the system 300. At 504, an appropriate hydrocarbon quantity is determined based on at least one of exhaust flow, a temperature, and/or time since last diagnosis. These features of the system 300 are further described in reference to FIG. 5B.

Figure 5B:
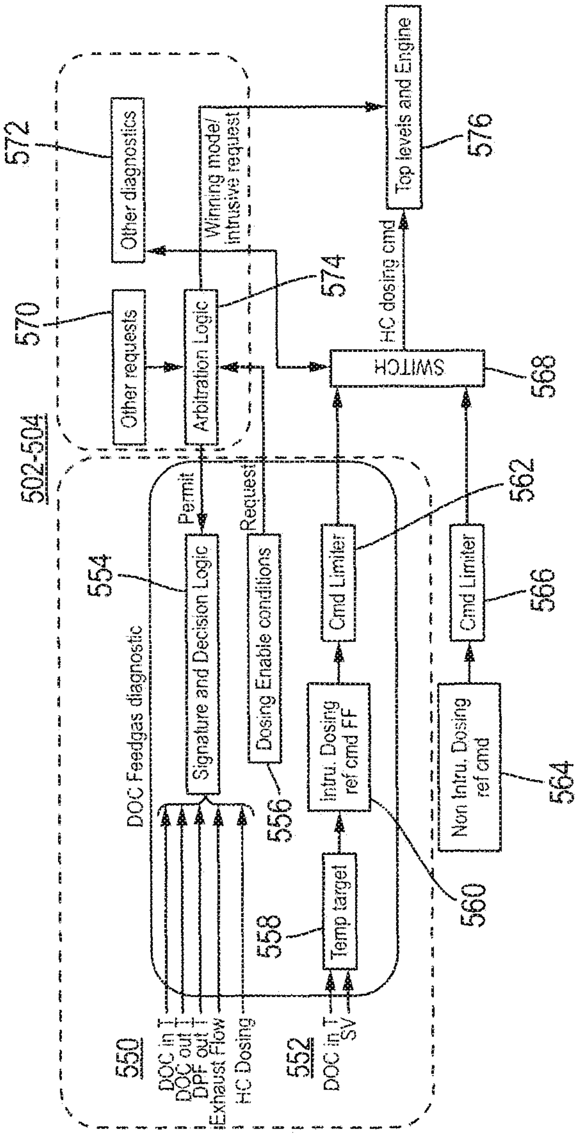
FIG. 5B is a diagram illustrating a subprocess, performed by the dosing circuit of an ECM component for feedgas diagnostics in an SCR, for coordinating requests.

FIG. 5B is a diagram illustrating subprocesses 502 and 504 performed by the hydrocarbon dosing circuit 350 of the controller 300 for coordinating requests.

In one example implementation, as shown, a DOC feedgas diagnostic system may include sensors or equivalent structures for accepting electronic signals and/or data inputs, such as one or more inputs 550. Examples of inputs 550 include inflow temperature of the DOC 202, outflow temperature of the DOC 202, outflow temperature of the DPF 102, exhaust flow, and hydrocarbon dosing.

As shown in FIG. 5B, the hydrocarbon dosing circuit 350 is configured to receive one or more inputs 550. These inputs may be received by a signature and decision logic 554, which in some embodiments may be part of the hydrocarbon dosing circuit 350. The signature and decision logic 554 may function to assess whether determining hydrocarbon quantity (504) should occur. This assessment is made based at least on an input signal from the arbitration logic 574, which may be part of the hydrocarbon dosing circuit 350 or, alternatively, may reside elsewhere in the aftertreatment system 100.

The arbitration logic 574 acts to issue the input signal to the signature and decision logic 554 in response to at least one of the following requests: a request 556 to enable hydrocarbon dosing conditions, a request 570 to perform other system functions, such as a DPF soot regeneration maneuver, or a request 572 to perform other diagnostic functions, such as an SCR catalyst $NO_x$ conversion efficiency diagnostic maneuver. Request 556 is initiated from within the DOC feedgas diagnostic system by the monitoring circuit 340 as described in reference to FIG. 4A. Requests 570 and 572 may be initiated from outside the DOC feedgas diagnostic system.

In addition to the above, arbitration logic 574 acts to issue input signals denoting the status of a request for intrusive hydrocarbon dosing to the top-level engine controls 576.

Another set of inputs in the example embodiment as shown are one or more inputs 552. Inputs 552 include DOC inflow temperature and space velocity assessed as described in reference to 402 of FIG. 4A.

Based on the input values, a temperature target 558 is set. The temperature target may be set to accomplish a fixed temperature increase of the DOC bed by dosing the hydrocarbon. In some embodiments, the temperature target may be set by the diagnostic circuit 360 configured to estimate the heat transfer through the DOC 202 based on an estimated exotherm of DOC 202, as described with respect to 602. Subsequently to setting the temperature target 558, the system is configured to issue a command to initiate intrusive dosing 560 and set a command limiter 562 to prevent the rapid execution of multiple intrusive hydrocarbon events or to prevent the occurrence of multiple intrusive diagnostics running simultaneously. Setting a command limiter helps avoid creating too much heat in the system and may help conserve fuel.

The inputs may activate the switch 568, which may issue a hydrocarbon dosing command to the top-level engine controls 576. In some embodiments, the switch 568 may be configured to receive commands for non-intrusive dosing 564 together with non-intrusive dosing command limiters 566.

Figure 6B:
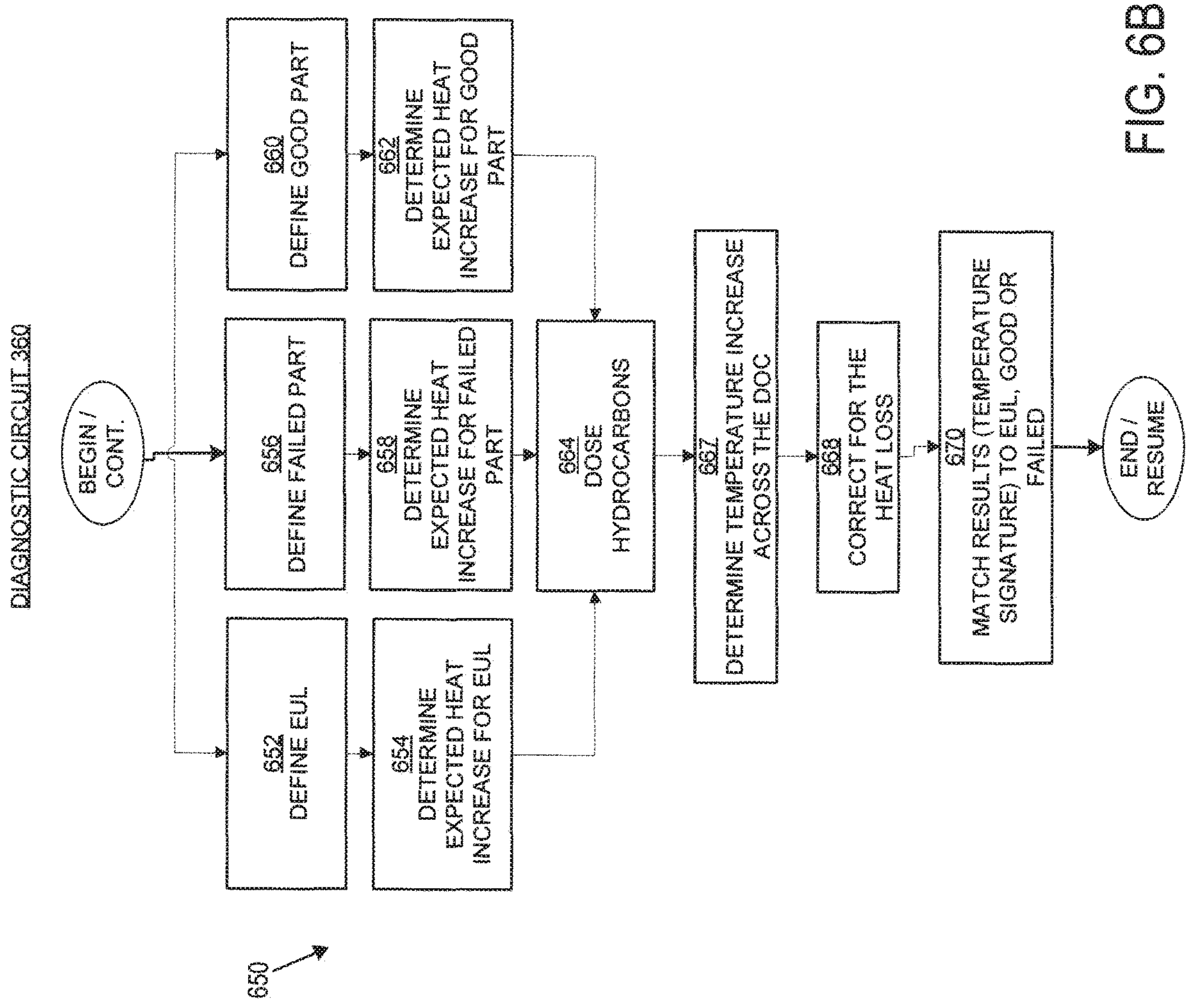
FIG. 6B is a flowchart showing an example subprocess for detecting a malfunction using a heat transfer evaluation process.
Figure 6A:
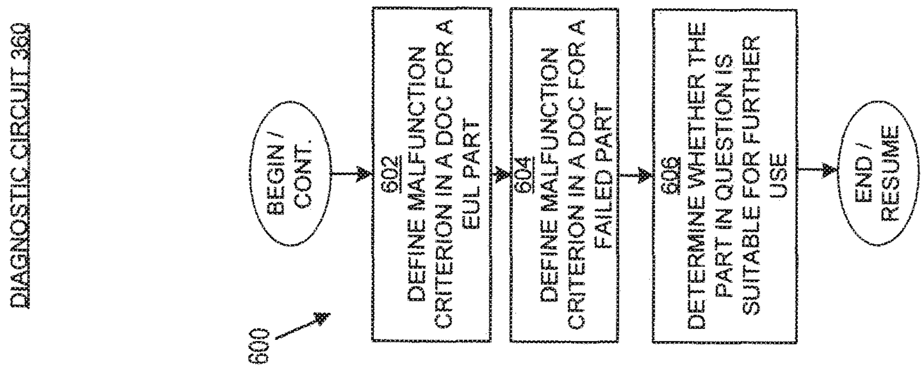
FIG. 6A is a flowchart showing an example process performed by a diagnostic circuit of an ECM component for feedgas diagnostics in an SCR.

FIG. 6A is a flowchart showing an example process 600 performed by a diagnostic circuit 360 of a controller 300. The process 600 enables making a model-based diagnostic determination with respect to DOC 202 and/or its parts such that certain components, described below, are assessed for an end of useful life (EUL) or failure. Components may be assessed by comparing actual values to estimated values. In some embodiments, the actual values are measured by the diagnostic circuit 360. In other embodiments, the actual values are received as inputs, such as inputs 550 and/or 552, from sensors, such as sensor 150. In some embodiments, the model used at 600 is provided by the tuning circuit 370 as described in reference to FIG. 7. In some embodiments, determining the fault condition of the oxidation catalyst includes determining, by the diagnostic circuit 360, whether clean-up is needed by evaluating the level of contaminant accumulation in the DOC.

At 602, the diagnostic circuit 360 defines a malfunction criterion in the DOC 202 for a part that may be nearing the end of its useful life (EUL part). In some embodiments, the malfunction criterion may be defined by estimating the heat transfer through the DOC 202 based on the projected exotherm. The diagnostic circuit 360 may be programmably configured to estimate the exotherm, based on electronic values representing inputs 550 and/or 552, using a suitable procedure for calculating and/or determining thermal energy transfer. Examples of such calculations are:

$\dot{m}_{exhuastflow} \times \lfloor C_{p\text{-}flow\text{-}in} \times T_{DOC\ in} - C_{p\text{-}flow\text{-}out} \times T_{DOCout} \rfloor$ (heat power from the exhaust flow where $\dot{m}_{exhuastflow}$=mass flow of exhaust, $C_{p\text{-}flow\text{-}in}$=heat capacity of the gas flowing into the DOC, $T_{DOC\ in}$=inlet gas temperature of DOC (typically K), $C_{p\text{-}flow\text{-}out}$=heat capacity of the gas flowing out of the DOC, and $T_{DOCout}$=temperature of gas flowing out of the DOC);

$m_{DOC} \times C_{p\text{-}DOC} \times \dot{T}_{Bed\ DOC}$ (heat power lost or gained from or to the DOC substrate, where $m_{DOC}$=mass of DOC in kg, $C_{p\text{-}DOC}$=heat capacity of the DOC substrate, and $\dot{T}_{Bed\ DOC}$=rate of change of the substrate temperature of the DOC);

$[T_{Bed\ DOC}{}^4 - T_{ambient}{}^4] \times surface\_area_{DOC} \times 5.6697 \times 10^{-8} \times$ emissivity (radiation power to the ambient, where $T_{Bed\ DOC}$=bed temperature of the DOC (substrate temperature), $T_{ambien}$=temperature of the ambient air surrounding the aftertreatment system, $surface\_area_{DOC}$=outside surface area of the DOC, and emissivity is the measure of an object's ability to emit infrared energy);

$[T_{Bed\ DOC} - T_{ambient}] \times f(v_{air})$ (convection power to the ambient, where $T_{Bed\ DOC}$=bed temperature of the DOC (substrate temperature) and $T_{ambien}$=temperature of the ambient air surrounding the aftertreatment system);

$LHV_{Diesel} \times \eta_{EUL}(T_{DOC\ Bed}) \times \dot{m}_{HC}$ (exothermic energy from hydrocarbons, where $LHV_{Diesel}$=lower heating value, $\eta_{EUL}(T_{DOCBed})$=EUL DOC efficiency, and $\dot{m}_{HC}$=mass flow of hydrocarbon.)

The foregoing list of examples is not intended to be exhaustive. Some example implementations of 602 are further discussed in reference to FIG. 6B.

At 604, the diagnostic circuit 360 defines a malfunction criterion in the DOC 202 for a part that may be failing. In some embodiments, the malfunction criterion may be defined by estimating the heat transfer through the DOC 202 based on its projected exotherm. The diagnostic circuit 360 may be programmably configured to estimate the exotherm, based on electronic values representing inputs 550 and/or 552, using a suitable formula for calculating thermal energy transfer, as explained above.

At 606, the diagnostic circuit 360 determines, based in part on the above, whether the part in question is suitable for further use (good, EUL or failed). This determination may be made, in some embodiments, based on thresholds and data such as those shown in FIGS. 9 and/or 10.

FIG. 6B is a flowchart showing an example subprocess for detecting a DOC malfunction using a heat transfer evaluation process. In the embodiment shown, the malfunction detection criterion is the degree of similarity between the expected and actual heat transfer results, as assessed in a comparison actual heat transfer of the DOC to each or some of three models representing an EUL DOC, a failed DOC, and a good DOC.

At 652, an EUL part is defined. In one example embodiment, an EUL part is defined as a part with a 5-10% remaining operating capacity. At 654, the expected heat increase across the DOC is calculated for an EUL part. At 656, a failed part is defined. In one example embodiment, a failed part is defined as a part with less than 5% remaining operating capacity. At 658, the expected heat increase across the DOC is calculated for a failed part. At 660, a good part is defined. In one example embodiment, a good part is defined as a part that has an operating capacity of greater than 10%. At 662, the expected heat increase across the DOC is calculated for a good part. At 664, hydrocarbon is intrusively dosed into the system. At 667, the temperature increase across the DOC is determined. The temperature increase may be determined by, for example, using sensors, such as sensors 150. At 668, the estimate of 654, 658, and/or 662 is corrected for heat loss. At 670, one may compare expected temperature rise of the DOC due to the burning of the dosed hydrocarbon to the observed temperature rise across the DOC, correcting for the heat loss to ambient conditions. One may determine the status of the part based on which model matches more closely.

In another implementation of systems and methods for determining whether the part in question is suitable for further use, one may use the min-max method: after intrusively dosing the hydrocarbon, one would wait for a full oxidation reaction to complete and then analyze the difference between the maximum of DOC outlet temperature and DOC inlet temperature. A good part is expected to have a higher temperature difference than a failed part. In some implementations, a threshold may be defined such that the temperature difference is indicative of a failed part if the difference exceeds the threshold.

In still another implementation, one may use the exotherm method: after intrusively dosing the hydrocarbon, one may calculate the potential energy of the dosed hydrocarbon, the actual exotherm (heat) generated across the DOC, and the normalized efficiency by dividing the actual exotherm by the potential energy of dosed hydrocarbon. In some embodiments, the exotherm generated across the DOC is determined based on the energy/exotherm calculation across the DOC. A method, such as one described above herein, is implemented by configuring the hydrocarbon dosing circuit 350 of the controller 300 to carry out the evaluation. In some embodiments, the normalized efficiency is calculated using the equation: normalized efficiency=(exotherm generated)/(estimated potential energy based on the hydrocarbon dosed). A good/satisfactory part is expected to have a higher efficiency value than a failed part. In certain embodiments, a threshold is defined and the DOC is considered good if the normalized efficiency value exceeds the threshold.

In yet another implementation, one may use an enhanced min-max method. Similar to the min-max method, one may calculate the difference between the maximum DOC outlet temperature and DOC inlet temperature. One may then take into account ambient temperature within the system to adjust for heat loss. In some embodiments, this evaluation is based, for example, on the temperature at the DOC inlet, exhaust flow, feedback hydrocarbon dosing and/or additional ambient conditions that help estimate the temperature at the DOC outlet. In some embodiments, the estimated temperature at the DOC outlet is compared with the actual temperature at the DOC outlet, which may be measured by a temperature sensor. In some implementations, a threshold is defined such that when the difference between the actual and estimated temperatures at the DOC outlet is less that the threshold, the DOC is considered to be a good part.

In some implementations, catalyst clean-up is performed after the catalyst diagnosis in order to remove any unburned hydrocarbons or other contaminates that may have accumulated during the feedgas generation capacity diagnostic. Catalyst clean-up may comprise raising exhaust gas temperatures by modifying an engine operating parameter, such as rail pressure, fuel injection timing, variable geometry turbocharger (VGT) position, exhaust gas recirculation (EGR) valve position, an intake throttle and/or an exhaust throttle. In some implementations, catalyst clean-up may comprise modifying an engine operating parameter by decreasing engine-out soot and hydrocarbon.

Figure 7:
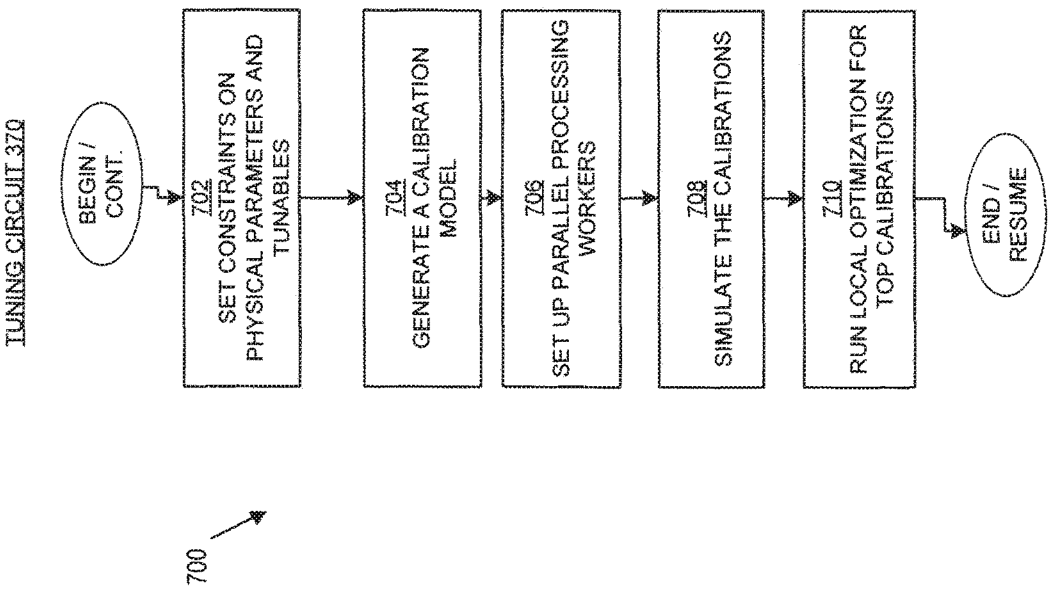
FIG. 7 is a flowchart showing an example process performed by a tuning circuit of an ECM component for feedgas diagnostics in an SCR.

FIG. 7 is a flowchart showing an example process performed by a tuning circuit 370 of a controller 300. The tuning circuit enables the generation of a calibration model, which is provided to the diagnostic circuit 360.

At 702, constraints (upper and lower limits) are set for physical parameters and tunables. Examples of physical parameters and tunables for which constraints may be set include catalyst surface area, substrate mass, heat capacity of the substrate material (Cp), DOC length, DOC external convection term for heat loss due to air moving across the surface of the DOC enclosure, and DOC emissivity for heat loss due to thermal radiation. Additional parameters suitable for calibration may be identified.

Figure 8:
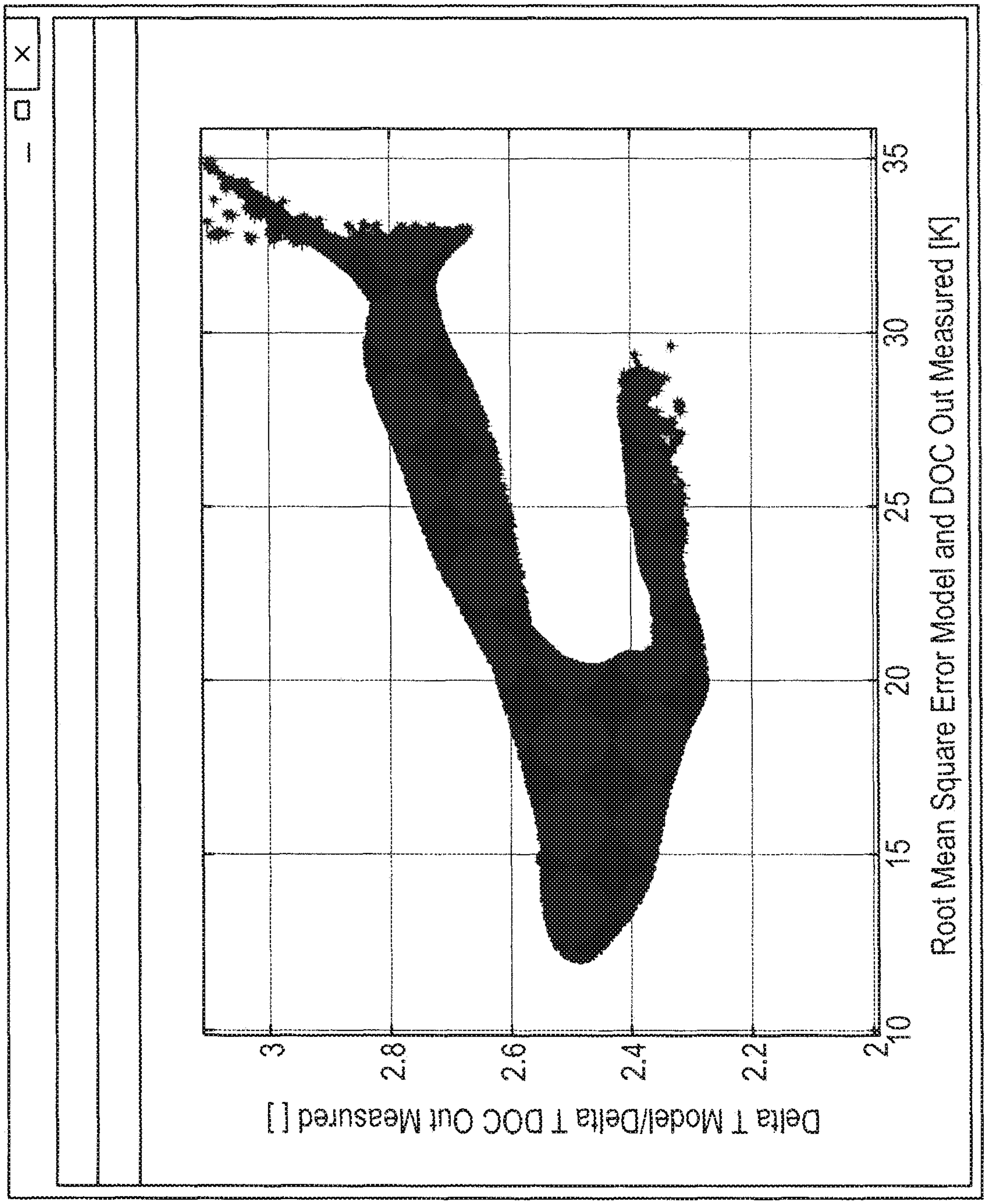
FIG. 8 is a chart showing a first example output of an example process of calibration performed by the tuning circuit.

At 704, a calibration model is generated. One example embodiment of a calibration model, an output of which is shown in FIG. 8, is a Latin Hypercube set of 46,656 plausible collections of parameter values generated using Matlab™. Another suitable algorithm may be used.

At 706, parallel processing computing devices are set up to carry out the simulation. One example implementation is comprised of a cluster including a plurality of computers and a client machine from which simulation processing commands may be rendered. In some embodiments, each computing device in the cluster may be a stand-alone computer. In other embodiments, each computing device in the cluster is a shared computing resource, as in cloud-based implementations, only a portion of which is allocated to the processing of the simulation. Another suitable distributed computing environment may be used.

Figure 9:
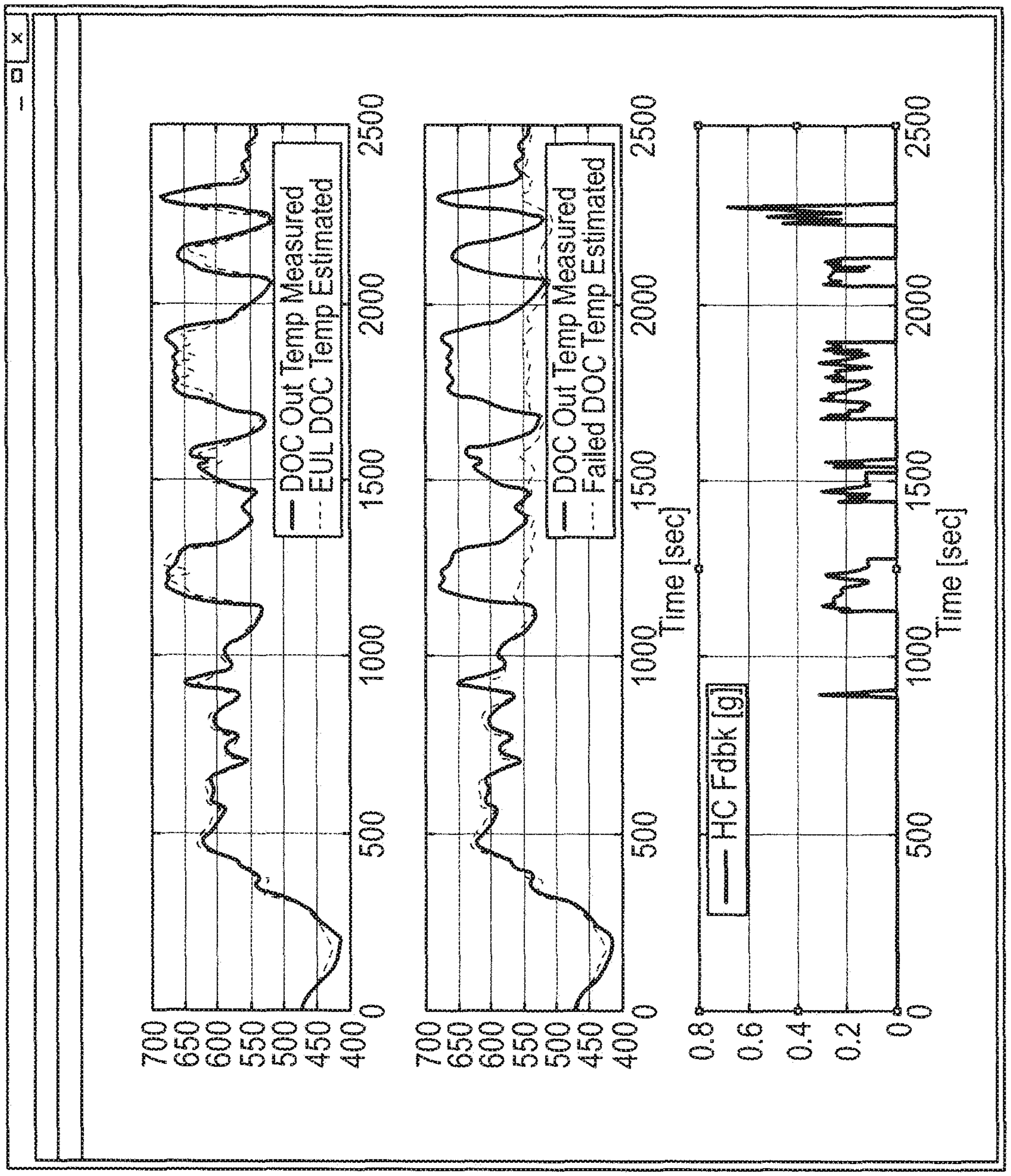
FIG. 9 is a chart showing a second example output of an example process to identify a point in the lifecycle of a DOC representing the end of useful life (EUL), showing variations in DOC temperature as a function of time.
Figure 10:
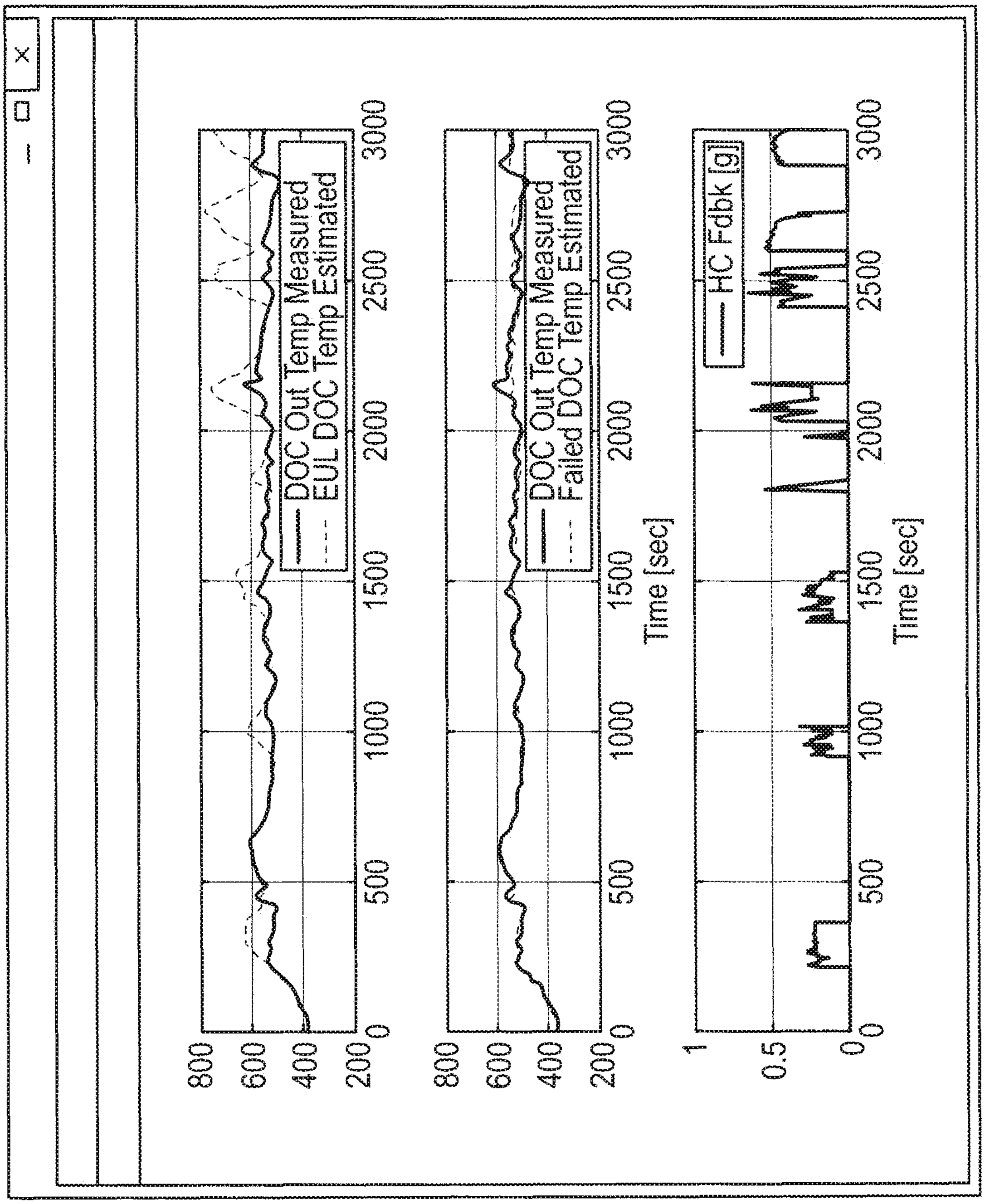
FIG. 10 is a chart showing a third example output of an example process to identify a point in the lifecycle of a DOC representing a severely degraded condition, and further showing variations in DOC temperature and hydrocarbon dosing as a function of time.

At 708, calibrations are simulated. Example outputs are shown in FIGS. 8, 9 and 10. At 710, top calibrations in the set are identified and, in some embodiments, the tuning circuit 370 may be further configured to run a local optimization on these top calibrations with, for example, a Matlab™ function or another suitable computation.

FIG. 8 is a chart showing a first example output of an example process of calibration performed by the tuning circuit 370. As shown, the output is a Latin Hypercube set of simulations corresponding to a plausible collection of parameter values generated, based on the physical parameters and tunables enumerated above, using Matlab™.

FIG. 9 is a chart showing a second example output of an example process of calibration to identify a point in the lifecycle of a DOC representing the end of useful life (EUL), showing variations in DOC temperature as a function of time.

FIG. 10 is a chart showing a third example output of an example process of calibration to identify a point in the lifecycle of a DOC representing 5% remaining capacity, showing variations in DOC temperature and hydrocarbon feedback as a function of time. These variations are indicative of a severely degraded condition of the DOC. Severely degraded condition is defined in the example embodiment as less than 5% remaining capacity, which in some embodiments, may be defined as PGM load on the DOC. Hydrocarbon feedback indicates how much hydrocarbon was dosed on the DOC during the calibration process.

Figure 11:
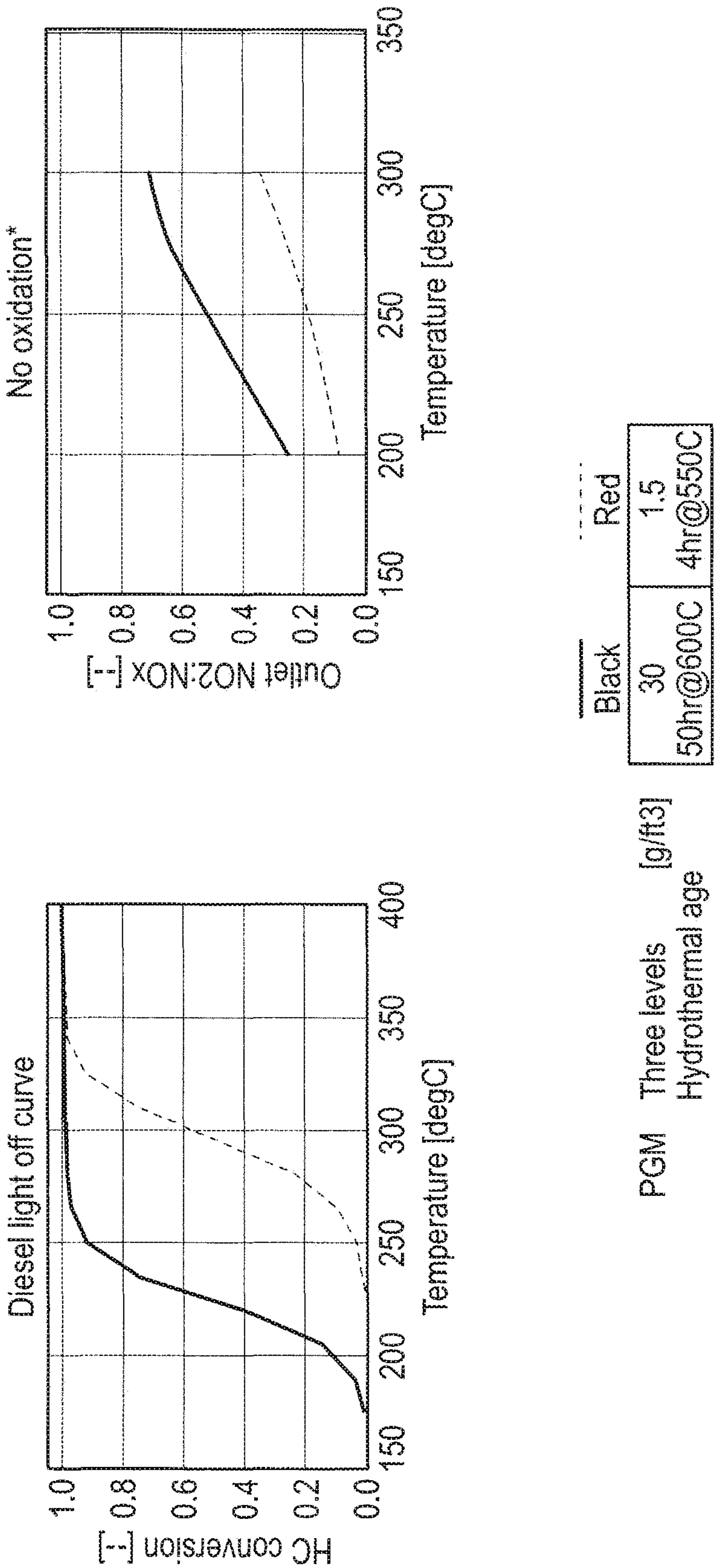
FIG. 11 is a chart showing DOC performance, in relation to such metrics as the hydrocarbon conversion ratio and NO oxidation, based on the hydrothermal age of the DOC.

FIG. 11 is a chart showing DOC performance, in relation to such metrics as the hydrocarbon conversion ratio and NO oxidation, based on the hydrothermal age of the DOC. Hydrothermal age refers to the amount by which the catalyst was aged by exposing it to heat in the presence of water.

In an example embodiment as shown, the system is configured to selectively dose the hydrocarbon within the temperature range of 210 to 280 degrees Celsius. In this range, one may finely tune the differentiation between the healthy and failed parts. In one implementation, the NO oxidation ratio may be optimized by determining and intrusively dosing hydrocarbon at a temperature range where the rate of conversion increases the fastest. In another implementation, the hydrocarbon conversion ratio may be optimized by determining and intrusively dosing hydrocarbon at a temperature range where the NO oxidation ratio is maximized. Similarly, in one implementation, the NO oxidation ratio may be optimized by determining and intrusively dosing hydrocarbon at a temperature range where the rate of oxidation increases the fastest. In another implementation, the NO oxidation ratio may be optimized by determining and intrusively dosing hydrocarbon at a temperature range where the oxidation ratio is maximized. Additionally or alternatively, the DOC temperature may be controlled by adjusting the hydrocarbon dosing.

Figure 12:
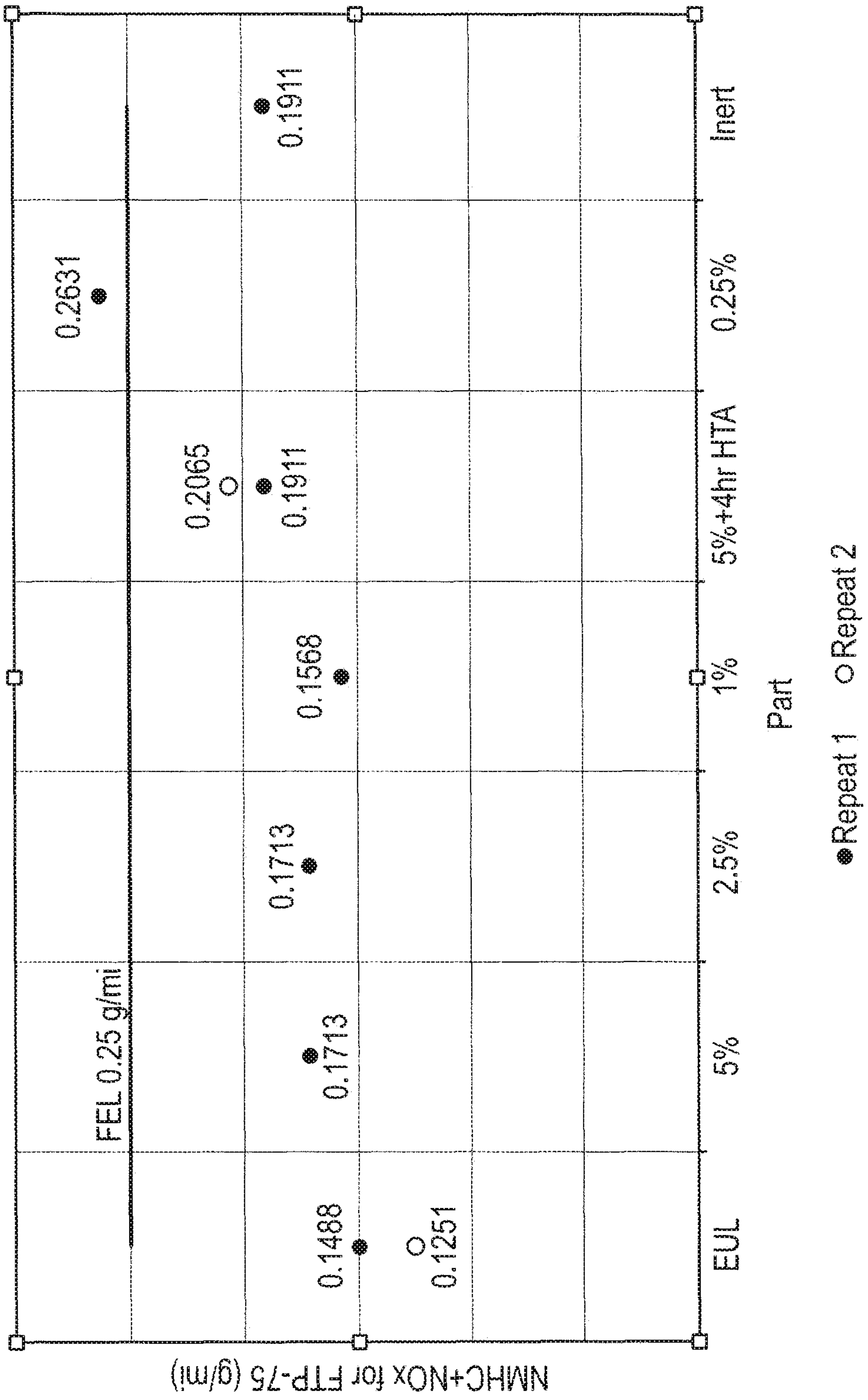
FIG. 12 is a chart showing emission data results in a series of tests conducted on a DOC of an example embodiment.

FIG. 12 is a chart showing emission data results in a series of tests conducted on a DOC of an example embodiment. As shown, in an example embodiment, the emission data results helped establish a correlation between degraded feedgas (the x-axis) and increased system $NO_x$ emissions (y-axis).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desired results. In certain circumstances, the separation of various system components in the implementations described above should not be understood as requiring such separation in all implementations, and it should be understood that the described components and systems can generally be integrated in a single product or packaged into multiple products embodied on tangible media.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

As utilized herein, the terms "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The term "coupled" and the like as used herein means the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for diagnosing feedgas generation capacity of an oxidation catalyst in an exhaust aftertreatment system, the method comprising:

determining a first temperature value at a first location in the exhaust aftertreatment system upstream of an oxidation catalyst, the oxidation catalyst being upstream of a selective catalytic reduction catalyst;

determining a space velocity of the exhaust in the oxidation catalyst;

determining an estimated exotherm value of the oxidation catalyst based on the first temperature value and the space velocity;

instructing a doser of the aftertreatment system to dose hydrocarbon into the oxidation catalyst;

determining an in-use exotherm value of the oxidation catalyst upon insertion of the hydrocarbon into the oxidation catalyst; and determining a fault condition based upon a comparison between the estimated exotherm value and the in-use exotherm value.

2. The method of claim 1, wherein the estimated exotherm value is configured to measure heat transfer through the oxidation catalyst.

3. The method of claim 1, further comprising:

calculating a potential energy of the hydrocarbon;

calculating a normalized efficiency value based upon the in-use exotherm value and the potential energy; and evaluating the normalized efficiency value to determine the fault condition of the oxidation catalyst.

4. The method of claim 1, further comprising measuring a second temperature of the exhaust at a second location downstream of the oxidation catalyst, wherein the estimated exotherm value is further based on the second temperature.

5. The method of claim 4, wherein the oxidation catalyst is a first oxidation catalyst and the in-use diagnostic hydrocarbon dosing command is a first in-use diagnostic hydrocarbon dosing command, the method further comprising:

measuring a third temperature of the exhaust upstream of a second oxidation catalyst positioned upstream of the selective catalytic reduction catalyst;

measuring a fourth temperature of the exhaust downstream of the second oxidation catalyst; and instructing the doser, in response to a second in-use diagnostic hydrocarbon dosing command, to insert the hydrocarbon in the second oxidation catalyst based at least on the third temperature and the fourth temperature.

6. The method of claim 5, further comprising:

calculating a first temperature delta based on the first temperature and the second temperature after both the first in-use diagnostic hydrocarbon dosing command and the second in-use diagnostic hydrocarbon dosing command are executed;

calculating a second temperature delta based on the third temperature and the fourth temperature; and comparing the first temperature delta to the second temperature delta to determine a feedgas generation fault condition for the first oxidation catalyst.

7. The method of claim 4, further comprising:

evaluating an ambient temperature within the oxidation catalyst during the determination of the fault condition; and adjusting a temperature delta computed based on ambient temperature, wherein the temperature delta is based upon the first temperature and the second temperature.

8. The method of claim 1, wherein the temperature of the exhaust at an inlet of the oxidation catalyst, indicative of conditions for determining the fault condition, is within a range of 210 to 280 degrees Celsius.

9. The method of claim 1, further comprising instructing the doser to insert the hydrocarbon into the oxidation catalyst based upon a temperature of a bed of the oxidation catalyst.

10. The method of claim 1, further comprising performing a clean-up operation for removing unburnt hydrocarbon from the oxidation catalyst and any contaminant accumulated in the oxidation catalyst upon the determination of the fault condition.

11. The method of claim 10, wherein performing the clean-up operation comprises increasing temperature of the exhaust by modifying an engine operating parameter.

12. The method of claim 10, wherein performing the clean-up operation comprises reducing engine-out soot and hydrocarbon.

13. The method of claim 1, wherein the doser is an external fuel doser or an in-cylinder doser.

14. The method of claim 1, further comprising:

measuring a second temperature of the exhaust at a second location downstream of the oxidation catalyst, wherein determining the fault condition of the oxidation catalyst further comprises:

building a first set comprising at least one inlet temperature value and determining the maximum value in the first set;

building a second set comprising at least one outlet temperature value and determining the maximum value in the second set; and based at least on the difference between the maximum value in the first set and the maximum value in the second set, determining the fault condition of the oxidation catalyst.

15. The method of claim 1, further comprising:

positioning the oxidation catalyst within an oxidation catalyst enclosure; and determining the fault condition of the oxidation catalyst by:

evaluating a surface area of the oxidation catalyst enclosure; and adjusting for heat loss due to air moving across the surface area of the oxidation catalyst enclosure.

16. The method of claim 1, further comprising calculating emissivity of the oxidation catalyst to adjust for heat loss due to thermal radiation for determining the fault condition.

* * * * *